June 16, 1925.
G. KLINKENSTEIN ET AL
WAFER CAPSULE
Filed Sept. 2, 1922
1,541,967
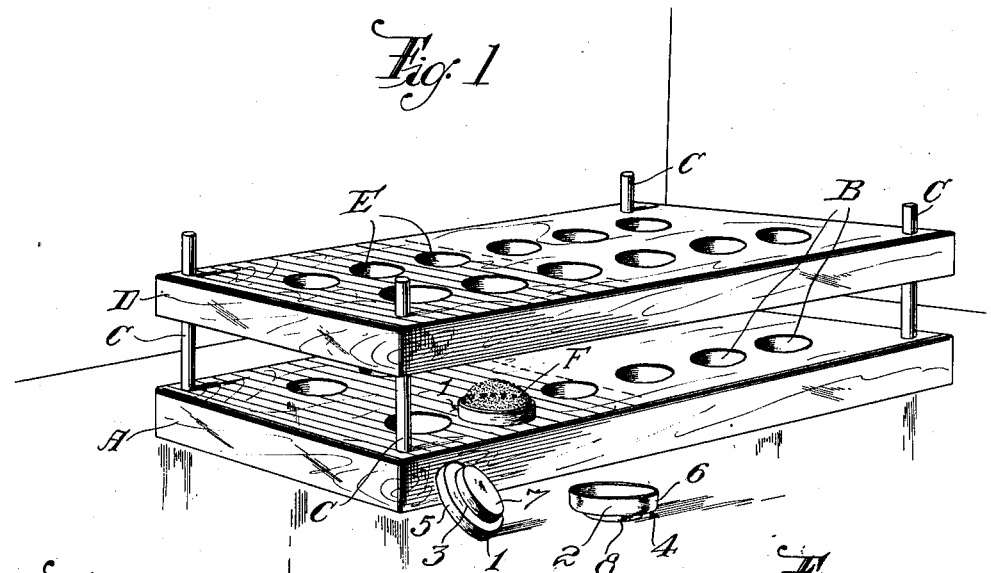
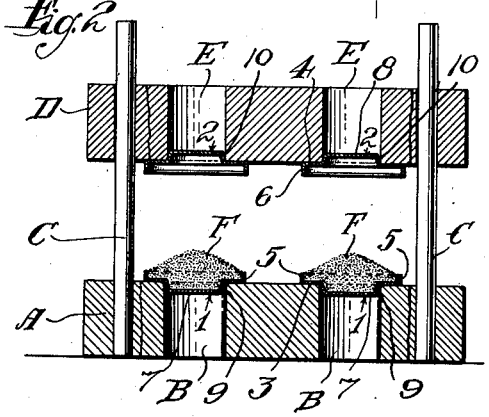
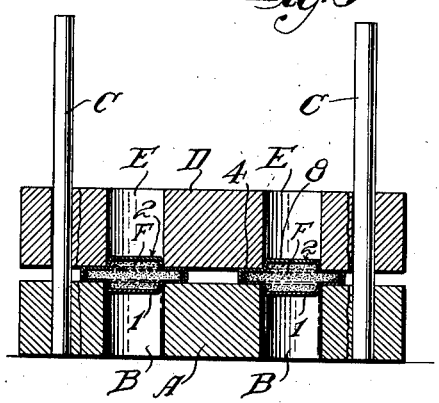
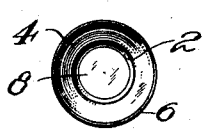
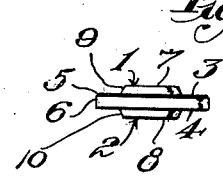
INVENTORS:
Gustave Klinkenstein,
John L. Litomy and
Emil Plaveczky,
BY
Everett Rook,
ATTORNEYS.

Patented June 16, 1925.

1,541,967

UNITED STATES PATENT OFFICE.

GUSTAVE KLINKENSTEIN, OF NEW YORK, N. Y.; JOHN L. LITOMY, OF GLEN RIDGE, AND EMIL PLAVECZKY, OF WEST ORANGE, NEW JERSEY.

WAFER CAPSULE.

Application filed September 2, 1922. Serial No. 585,911.

*To all whom it may concern:*

Be it known that we, GUSTAVE KLINKENSTEIN, JOHN L. LITOMY, both citizens of the United States, and EMIL PLAVECZKY, a citizen of Hungary, and residents, respectively, of New York, in the borough of Bronx and State of New York; Glen Ridge, in the county of Essex and State of New Jersey; and West Orange, in the county of Essex and State of New Jersey, have invented new and useful Improvements in Wafer Capsules, of which the following is a specification.

This invention relates to capsules of the wafer type commonly used for administering pulverulent or powdered medicines.

Heretofore wafer capsules have been composed of two sections of substantially the same size which have been secured together to enclose a medicine with their edges abutting and sealed by some form of adhesive. This form of capsule easily breaks apart and is expensive and troublesome to assemble, but has been used for the reason that no wafer capsule has been produced the sections of which will telescope and remain together so as to withstand handling as in the well-known elongated cylindrical type of capsule.

One object of our invention is to provide a wafer capsule comprising two cup-shaped sections embodying novel features whereby the edges of said sections telescope and frictionally engage to hold the sections together.

Further objects of the invention are to provide such a capsule comprising two cup-shaped sections having their edges adapted to telescope, and formed with reenforcements on their bottoms to prevent collapsing of the sections when handled and to maintain said edges in snug frictional engagement; to provide a wafer capsule of this character having integral central projections on the exterior of the bottoms which reenforce the walls of the sections and facilitate in proper positioning of the sections in a wafer filling and closing device, and to obtain other results and advantages as may be brought out by the following description.

Referring to the accompaying drawings, in which like numerals of reference indicate the same parts throughout the several views, Figure 1 is a perspective view of capsules embodying our invention showing the two sections thereof separated and also showing a device for filling and closing the capsules;

Figure 2 is a transverse vertical sectional view through the device shown in Figure 1, showing one section of the capsule filled with medicine and before being closed;

Figure 3 is a view similar to Figure 2 showing the capsule closed;

Figure 4 is a plan view of one of the sections of the capsule, and

Figure 5 is a side elevation of a capsule embodying the invention.

In the embodiment of the invention shown on the drawings, the reference characters 1 and 2 designate the two sections of a capsule which are formed of a suitable soluble and slightly elastic starchy material. Each of the sections 1 and 2 is substantially cup-shaped and wafer-like, said sections being provided with the respective bottom portions 3 and 4 and annular side walls or flanges 5 and 6 one of which is adapted to telescope within the other.

The capsule sections 1 and 2 are preferably formed in a mold, and the bottoms 3 and 4 are formed with integral exterior interiorly hollow projections 7 and 8 spaced inwardly from the respective flanges 5 and 6, forming similar shaped recesses on the interior of the sections. In other words, the walls of the projections 7 and 8 are portions of the bottoms 3 and 4 offset from the main planes of said bottoms. In the present instance the capsules are shown as circular in shape and the projections 7 and 8 are substantially co-axial with the capsule and preferably have their respective side walls 9 and 10 disposed at angles to the planes of the bottoms of the respective sections. The projections 7 and 8 provide reenforcements for the bottoms of the sections 1 and 2 to prevent collapsing, flexing or denting thereof when the capsule is handled, and thereby prevent springing or distorting of the flanges 5 and 6 to maintain frictional engagement thereof.

In filling the capsules one of the sections, preferably the smaller one, is placed in a horizontal position and the medicine deposited therein. The other section is then slipped over the first-mentioned section so that the flanges of the two sections are in telescoping relation and have a frictional engagement. The flanges of the sections 1 and 2 are preferably of such a size that when the sections are brought together as above described the flange of the smaller section is slightly compressed and the flange of the larger section is slightly expanded. Thus a tight frictional engagement is obtained, and it has been found that capsules constructed in accordance with the invention will withstand the necessary handling without coming apart or the sections separating.

The projections 7 and 8 are also advantageous in positioning the capsule sections in a filling device. Such a device is shown in Figures 1 to 3, inclusive, and comprises a base section A provided with a plurality of sockets or openings B of a diameter to loosely receive the projections on the capsules, as shown in Figures 2 and 3. The base section A is provided at its corners with a plurality of guide rods C on which is slidably mounted a cap piece D having openings E registering with the openings B in the base piece A. The openings E are of a diameter to snugly receive the projections on the capsules so that the sections of the capsules will be maintained in said openings by friction, as shown in Figure 2. In filling the capsules the smaller section of each of the capsules is mounted in one of the openings B in the base plate. The other sections of the capsules are fitted in the openings E on the underside of the cap piece D. The smaller sections of the capsules are then filled with the medicine, after which the cap piece D is allowed to descend on the guide rods C so as to slip the larger sections of the capsules over the other sections in the base piece A, as shown in Figure 3. The cap piece D is then raised and the base piece A inverted, whereupon the closed capsules fall from the openings of the base piece by action of gravity.

While we have shown and described one possible embodiment of our invention, it will be understood that this is mainly for the purpose of illustrating the principles of the invention and that many modifications and changes can be made in the capsule without departing from the spirit or scope of the invention. Therefore, we do not desire to be understood as limiting ourselves, except as required by the following claims when construed in the light of the prior art.

Having thus described the invention, what we claim is:

1. A wafer capsule including two cup-shaped wafer-like sections the side walls of which are formed to telescope and frictionally engage to hold said sections together, the bottoms of said sections being formed with integral hollow projections spaced inwardly of said side walls to prevent flexing or denting thereof and restrain said side walls from spring or distorting.

2. A wafer capsule including two cup-shaped wafer-like sections the side walls of which are formed to telescope and frictionally engage to hold said sections together, the bottom of each of said sections being formed with an exterior projection substantially coaxial with the section and disposed in spaced relation to said side walls to prevent flexing or denting of said bottom.

3. A wafer capsule including two cup-shaped wafer-like sections the side walls of which are formed to telescope and frictionally engage to hold said sections together, the bottom of each of said sections being formed with an integral coaxial hollow projection spaced inwardly of said side walls and portions of the walls of which are disposed at an angle to the bottom of the section to prevent flexing or denting of said bottom and thereby limit springing or distortion of said side walls of the sections.

GUSTAVE KLINKENSTEIN.
JOHN L. LITOMY.
EMIL PLAVECZKY.